US005148238A

United States Patent [19]

Gebhart

[11] Patent Number: 5,148,238

[45] Date of Patent: Sep. 15, 1992

[54] HOT KILN ALIGNMENT SYSTEM

[76] Inventor: Walter M. Gebhart, 72 Tapscott Rd., Unit 2, Scarborough, Ontario, Canada, M1B 3G7

[21] Appl. No.: 586,485

[22] Filed: Sep. 21, 1990

Related U.S. Application Data

[63] Continuation of Ser. No. 514,483, Apr. 25, 1990.

[30] Foreign Application Priority Data

Sep. 29, 1989 [CA] Canada .................................. 614456

[51] Int. Cl.[5] .............................................. G01B 11/14

[52] U.S. Cl. .................................... 356/375; 356/400

[58] Field of Search ............... 356/375, 399, 400, 138, 356/152, 153; 432/32, 103-119; 250/206.1, 206.2, 206.3; 73/865.9

[56] References Cited

U.S. PATENT DOCUMENTS

| | | | |
|---|---|---|---|
| 3,653,774 | 4/1972 | La Roche | 250/203.3 |
| 3,852,579 | 12/1974 | Sohn et al. | 356/387 X |
| 4,056,349 | 11/1977 | Parisis et al. | 432/32 X |
| 4,427,044 | 1/1984 | Plough et al. | 356/386 X |
| 4,533,319 | 8/1985 | Mathews et al. | 432/32 X |
| 4,991,965 | 2/1991 | Busch | 356/375 X |

FOREIGN PATENT DOCUMENTS

| | | | |
|---|---|---|---|
| 2221988 | 10/1974 | France | 432/103 |
| 157103 | 9/1982 | Japan | 356/375 |
| 307308 | 12/1988 | Japan | 356/375 |

*Primary Examiner*—Tom Noland

[57] ABSTRACT

The location of the rotational center line of a long, cylindrical body having a number of support bearings spaced along its length, is determined during the rotation of the body. The apparatus used particularly lends itself to the re-alignment of hot kilns, during their operation, without requiring shut down and the consequent disruption and loss of product. The system utilizes a base line or datum on each side of the kiln for locating the measuring instrument. The distance measuring instrument is a radiant beam instrument such as a diode laser providing an electronic readout, to enable accurate determination of the distance of the outer surface of the kiln shell from the instrument, and hence the location of the rotational center relative to the established baseline datum, for the longitudinal station being measured. A series of lateral center line determinations thus made along the length of a kiln, and including a like determination of the height of the center line at each measuring station, permits adjustment to selected ones of the kiln support bearings to align the rotational center line along the length of the kiln, including the correction of center line elevations.

3 Claims, 5 Drawing Sheets

HOT KILN ALIGNMENT SYSTEM

This is a continuation application of pending prior application Ser. No. 07/514,483, filed Apr. 25, 1990.

TECHNICAL FIELD

This invention is directed to a surveying process and apparatus for carrying out the process. In particular the surveying process is directed to taking alignment measurements of a rotary kiln, including use of the method with a hot, operating kiln.

BACKGROUND OF THE INVENTION

Hot kilns are used in carrying out a large number of economically important processes.

Owing to the nature of the process for which they are used such kilns may attain lengths as great as six hundred feet and be supported by annular tires carried on rollers, mounted upon piers as high as seventy feet above the ground.

The steel vessel constituting the kiln is relatively thin walled, being usually lined with a refractory lining to protect the walls of the vessel and to provide a protective thermal gradient to the kiln. The kiln shell is quite flexible, as a consequence.

Owing to the size of such kilns the daily throughput is of such value that shutdown of a kiln is to be avoided at all costs.

The construction of high temperature kilns necessitates provision being made for expansion of the shell, relative to its supporting tires. For this reason the tires generally fit loosely on the shell. The "looseness" of the arrangement is further complicated by wear that takes place in the supporting rollers, on which the tires are carried, and the susceptibility of the supporting piers, in many instances, to swaying during operation of the kiln.

As a consequence of these and other factors such kilns get out line, in that intermediate portions of the kiln do not rotate coaxially with other portions of the shell. This misaligned condition introduces unnecessary, but frequently unavoidable stresses, particularly in the thin walled shell, which are potentially destructive thereto.

In order to ameliorate this condition it is the aim of many existing methods to determine the centre of rotation at differing axial locations along a kiln, to permit compensating adjustment to be made to the rolls on which the kiln tires are supported, without shutting the kiln down, so as to bring the kiln into more close approximation of a single rotational axis.

The foregoing enunciated difficulties are compounded by the fact that kiln shells frequently exhibit dynamic ovality, in the running of the flexible shell within the stiffer tire.

Prior methods include sighting off side vertical tangents and the bottom dead centre of the tire, but could not effectively compensate for uneven wear over both the tires and the supporting rollers. Wear also takes place between the tire and its supporting pads, or the tire and the shell, which wear may destroy the concentricity of the construction.

The importance of an effective on-stream alignment measuring scheme is that, if of sufficient accuracy, it permits effective preventive maintenance to be carried out, to minimize kiln wear and damage.

Certain prior art hot kiln alignment measurement schemes exist, such as "Alignment of Rotary Kilns and correction of Roller Settings During Operation", B. Krystowczyk, Bromberg, Poland 1983, published Zement-Kalk-Gips Translation ZKG No. 5/83 (p.p. 288–292). This method uses an optical plumb to sight off vertical tangents to the kiln tires. The method suffers from inaccuracies due to variations in the tire to shell clearances.

The method is totally manual, and requires working closely adjacent to hot kiln surfaces, and is limited by human response times in the rate of taking readings as the kiln rotates.

In the case of faster rotating hot calciner kilns these can prove to be serious drawbacks. The method also requires the simultaneous taking of readings by three individuals, which again limits both speed and accuracy of applying the method.

The method further required a determination of the gaps existing between the tires and the kiln shell at the respective measuring spots, if desireable accuracy is to be achieved, as it is an improvement to the trueness of the shell to which the process is usually directed.

Another process involves the use of a laser theodolite and a second theodolite having their outputs connected with a computer. The laser theodolite is focussed at a point on the face of the surveyed tire, and the second theodolite, from a different location, is also focussed on the laser illuminated spot. The computer digests the respective angles of the theodolites and provides three dimensional x.y and z axis coordinates as the address for the instantaneous target, during rotation of the kiln. In addition to requiring multiple vantage points for viewing the tire, this method requires that the instruments be set up and calibrated a number of times, relative to a selected, single originating point. This system appears related to a similar system that has been used with considerable advantage in erecting large static structures such as chimney stacks, buildings and rocket launchers.

However, its adaption to a dynamic target such as a kiln wherein the supporting piers may be moving as a consequence of the dynamic and shell reaction forces generated, has been less than straightforward. The time required to set up the system is somewhat prohibitive, and the results achieved are barely adequate. Thus, the cost and complexity of this prior system has limited its applicability and popularity, with regard to kiln hot alignment.

A yet further process apparently adopted in response to the Krystowczyk method includes the use of plumb lines draped over the rotating tires, to determine their positions as vertical tangents relative to an established centre line datum.

The adoption of such manipulations has tended to reduce the credibility of hot alignment of kilns in the eyes of users.

In considering the prior art systems, it will be understood that kiln internal temperatures as high as 3000degrees F require that measurements to be made external to the kiln.

Most prior methods basically rely upon external procedures, for measurements involving measuring the diameter of the kiln supporting tires; the diameter of the tire supporting rolls; the gaps between the tire and kiln shell; and, the spacing between the respective supporting rolls. Using these measured values the location of the kiln centre is establishes geometrically.

However, it must be born in mind that typically the kiln tires may be as wide as two to three feet axial width, and the supporting rollers may be three to four feet in axial width. However, these items wear in service, the tires becoming convex surfaced, the rollers concave surfaced. As a consequence, the accuracy and constancy of measurements is highly suspect. Also, the kiln structure is temperature sensitive, so that thermal changes may effect significant variations in the relationships between the respective moving parts, some of which are directly influenced by kiln temperature, and others, such as the supporting rollers, much less so.

In further considering the background to kiln operation, including implications stemming from their design, it will be appreciated that the kiln supports, located at selected positions along its length , are intended to achieve even loading. Factors such as variations in refractory lining thickness, due to different temperatures and wear rates, variations in shell plate and tire thicknesses, non-uniformity in the travelling kiln load, variation in the thickness of internal coating of the refractory etc., may cause variations in load shell stiffness and ovality, and changing deflections at the supports which generally develop during the operation of a kiln.

SUMMARY OF THE INVENTION

In accordance with the present invention there is provided a method of determining the location of a long, substantially cylindrical body, during rotation thereof substantially about its polar axis.

The method includes determining the location of both sides of the body during its rotation, in relation to at least one fixed datum, to establish the mean centre of rotation relative to that datum.

The method relies upon the making of direct measurements on the location in space of external surface portions of the shell, namely the shell itself, or the annular ring of pads secured to the shell outer surface, upon which the kiln tires bear.

The establishment of the location of each side of the kiln during rotation generally involves the taking of a series of lateral distance readings at predetermined intervals during rotation of the body, which lateral readings may be averaged in order to provide a mean lateral distance to the targeted side of the body, from the point of measurement. These readings may then be corrected, relative to a fixed datum.

Repetition of these series of reading for selected stations located at axial intervals along the length of the body, permits the distance from the datum, as a mean value, to be obtained for each such station. Reading locations on the shell surface, or on tire support pads located adjacent the tires, are usually chosen.

Repetition of this process along the opposite side of the body, at the same axial stations, permits calculation of the respective mean centre line location at each station, from a selected common datum line or lines.

Positioning of the distance reading device away from the piers on which the kiln supporting rollers are carried serves to eliminate the effects of pier sway.

Recording of readings electronically permits readings to be taken of sufficient accuracy to encompass distance variations due to variations of the surface curvature of the shell, providing an enhanced and simplified method of determination.

In accordance with the present invention distance readings are taken using diode laser linear displacement type instrument or sonic or other equivalent located on the supporting piers, and reading at points on the surface of the kiln shell, or on the machined riding ring pads, which carry the supporting tire. These surfaces are oriented normally to the instrument.

Owing to the use of an electronic recording instrument such as a micro computer connected with such a short range diode laser or equivalent, continuous or pulsed distance measurements may be taken, to provide a comprehensive shell profile for the selected station.

As an example, in the case of the riding tire pads, at a kiln rotational speed as high as three revolutions per minute, with, typically, 36 pads equally spaced about the kiln circumference, by use of a microprocessor coupled to the diode laser, several readings for each pad may be obtained and logged electronically, during the fraction of a second for passage of the pad surface opposite, and normal to, the beam of the diode laser.

In the preferred embodiment a theodolite is first located in a reference plane, established between a pair of spaced apart targets, by taking sightings from the theodolite to the targets. Next the theodolite is brought into registry with a graduated horizontal scale secured to the diode laser, and focussed upon a gradation on that scale. The theodolite is now, by manual adjustment, held in its registry with the diode laser horizontal scale. Adjustments to maintain such registry are read out automatically, and transmitted as correction values to the microporcessor, or other recording means, so as to tie the diode laser to its fixed datum plane.

Thus, in the preferred embodiment the instantaneous location of the diode laser itself is recorded, using a theodolite positioned upon, or in known relation with an established datum plane, to read the diode laser position.

From readings thus obtained, the actual distance of the mean centre line from a preferred datum may be readily calculated, for each of a selected series of axial stations, referred to above.

Selecting a desired origin for the kiln theoretical centre line, the respective existing deviations from the theoretical centre line may then be calculated, and the respective supporting rollers or bearings may be repositioned, to bring the kiln to a new and improved alignment.

The process generally includes obtaining elevation values, by readings taken off bottom dead centre positions along the kiln, corresponding to the lateral reading stations, in lateral alignment therewith, in order to establish a mean centre line elevation profile. This elevational centre line is usually inclined from the horizontal, in accordance with kiln inclination, in order for the kiln to carry out its product feed function.

In carrying out the vertical measurements to the kiln the diode laser, functioning in a vertical orientation, is located at a respective work station, at the bottom dead centre (BDC) position, some inches below the kiln shell. From this position the desired distance readings are taken.

A lateral reference, to provide a horizontal datum plane for the diode laser is achieved by use of an auto level in conjunction with a fixed vertical elevation scale. The auto level is aligned with the reading plane of the diode laser and the vertical scale then read.

Thus, as the diode laser is measuring vertically to the shell or to the ring pads, as the case may be, the auto level is read, being focussed upon the fixed vertical elevation scale. This scale is of sufficient height to encourage the full range of vertical reading positions for all the kiln work stations. The auto level establishes the datum plane, relative to the diode laser, by which the diode laser readings are corrected to the common horizontal reference plane thus established.

Thus in a method determining the location of a rotating, substantially cylindrical body during the rotation thereof about its polar axis, steps are taken, comprising:

a) establishing a plurality of measuring stations in mutually spaced relation along one side of the body;

b) establsihing a first datum plane, preferably parallel with the body longitudinal axis, having visual access to the measuring station, and extending for at least a portion of the length of the body;

c) locating a distance measuring radiant beam instrument successively at each measuring station;

d) operating the distance measuring instrument at each station at predetermined intervals, during rotation of the kiln to provide readings of distance from the instrument to predetermined surface portions of the body aligned normal to the instrument and positioned about the body;

e) determining the off-set distance from the first datum plane to the measuring instrument, at each position of use; and, f) obtaining a mean value of the distance readings during rotation of the body, corrected for instrument off-set distance, to give a mean value of distance from the first datum plane to the surface of the body.

The method further extends to include establishing a second datum plane, preferably parallel with the first datum plane and a predetermined distance therefrom, on the other side of the body; carrying out the foregoing steps a), and c) through f), to provide mean values for distance readings, corrected for instrument off-set relative to the second datum plane, between the body surface and the second datum plane, at measuring stations in lateral alignment with the previously used measuring stations on the opposite side of the body; and calculating the distance of the mean centre of the body from one of the datum planes for each of the axial station locations, using the established data and the distance between the first and second datum planes.

In addition to the foregoing the method further includes the steps of determining the vertical distance from an established third datum plane extending below the bottom dead centre portion of the body, in a fashion similar to the use of the first and the second datum plane; orienting the radiant beam instrument successively, at axially spaced stations in lateral alignment with the aforementioned measuring stations, to measure vertically from the instrument to the bottom dead centre portion of the body, during rotation of the body; and calculating the respective mean vertical distance of the means centre of the body from the elevation datum plane.

In the preferred case, namely that of a rotary kiln mounted upon at least three supporting annular tires the aforesaid measuring station axial locations are positioned in close axial proximity to the tires.

With the kiln being a heated kiln, and mounted upon piers, the lateral measuring stations are preferably mounted upon the piers, in a position to permit upward viewing of the measuring station in a vertical plane that includes the reference datum.

In carrying out the method using a diode laser (DL) or equivalent for measuring the lateral and vertical distances, a mini-computer may be used to record the distance reading electronic outputs from the DL distance measuring instrument. These readings are simultaneously co-ordinated with readings from a theodolite giving the off-set distance between the respective datum plane and the DL. Owing to the low frequency and short amplitude or pier motion, if any, the datum establishing theodolite is kept focussed in fixed registry on a fixed gradation on the diode laser datum correction scale.

Lateral displacements of the DL in order to maintain its registry with the scale selected gradation is measured electronically as a digital readout, and sent to the mini computer, as a correction to the lateral distance reading outputs of the DL.

In calculating the mean distance R from a selected datum to the kiln centre line, the formula is used:

$$R=K1+X+\tfrac{1}{2}[S-(K1+K2+X+X1]$$

where K1 is the off-set distance from first datum plane to instrument;

K2 is the off-set distance from second datum plane to instrument;

X1 is the mean distance from instrument to the adjacent shell surface;

X2 is the mean distance from the relocated instrument to the adjacent shell surface; and, S is the lateral distance between the first and the second datum planes.

From a table showing R value for each of the axial work stations, together with an E value, (for elevation calculated values) the requisite corrections, both lateral and vertical, to be applied to the support bearings may be readily obtained.

In general, such R values would be adjusted in relation to one fixed support, which would remain unadjusted. The adjusted values, as algebraic differences from the fixed support would represent lateral corrections to be applied to the respective other supports, necessary to bring the shell rotational axis back into alignment.

The vertical bearing corrections may be similarly applied, due attention being paid to the required kiln gradient, to restore a true, unitary axis of rotation.

The present invention further provides apparatus for determining the location of a body having a generally cylindrical annular surface, during rotation of the body, comprising a diode laser distance measuring instrument for measuring from a predetermined location to an adjacent surface portion of the body positioned normal to the instrument: datum plan generating means for establishing a predetermined vertical datum, including instrument means positionable relative to the datum and pivotable parallel with the datum plane, the diode laser having indexed locating means related thereto, to extend through the reference datum, being readable by the instrument means, whereby the projected distance from the body surface portion to the datum comprises the algebraic sum of the readings of the instruments.

The subject instruments, having electronic outputs therefrom, may be combined with electronic recording means connected thereto, enabling recording of simultaneous readings from the instruments, and the recording of a multiplicity of such reading during rotation of the annular surface.

In the preferred embodiment and method, the theodolite means is maintained in continuous alignment with a registration on the indexed locating means. As the theodolite is traversed laterally, manually, to maintain the indexed registration, a readout of its displacement is transmitted to the recording means, to provide a continuous correction relating the diode laser to the datum plane.

The electronic recording means may comprise a computer; and the datum generating means may comprise a pair of theodolite targets in mutually spaced apart relation, having the theodolite located therebetween, for positioning the theodolite so as to enable it to generate a desired reference plane. As an alternative embodiment, a laser beam generator, generating a narrow, visible beam may be used for locating the theodolite instrument in aligned operative relation therewith, to establish the desired reference plane.

BRIEF DESCRIPTION OF THE DRAWINGS

Certain embodiments of the invention are described by way of illustration, and without limitation of the invention thereto, reference being made to the accompanying drawings, wherein.

DETAILED DESCRIPTION OF THE INVENTION

Figure 1:
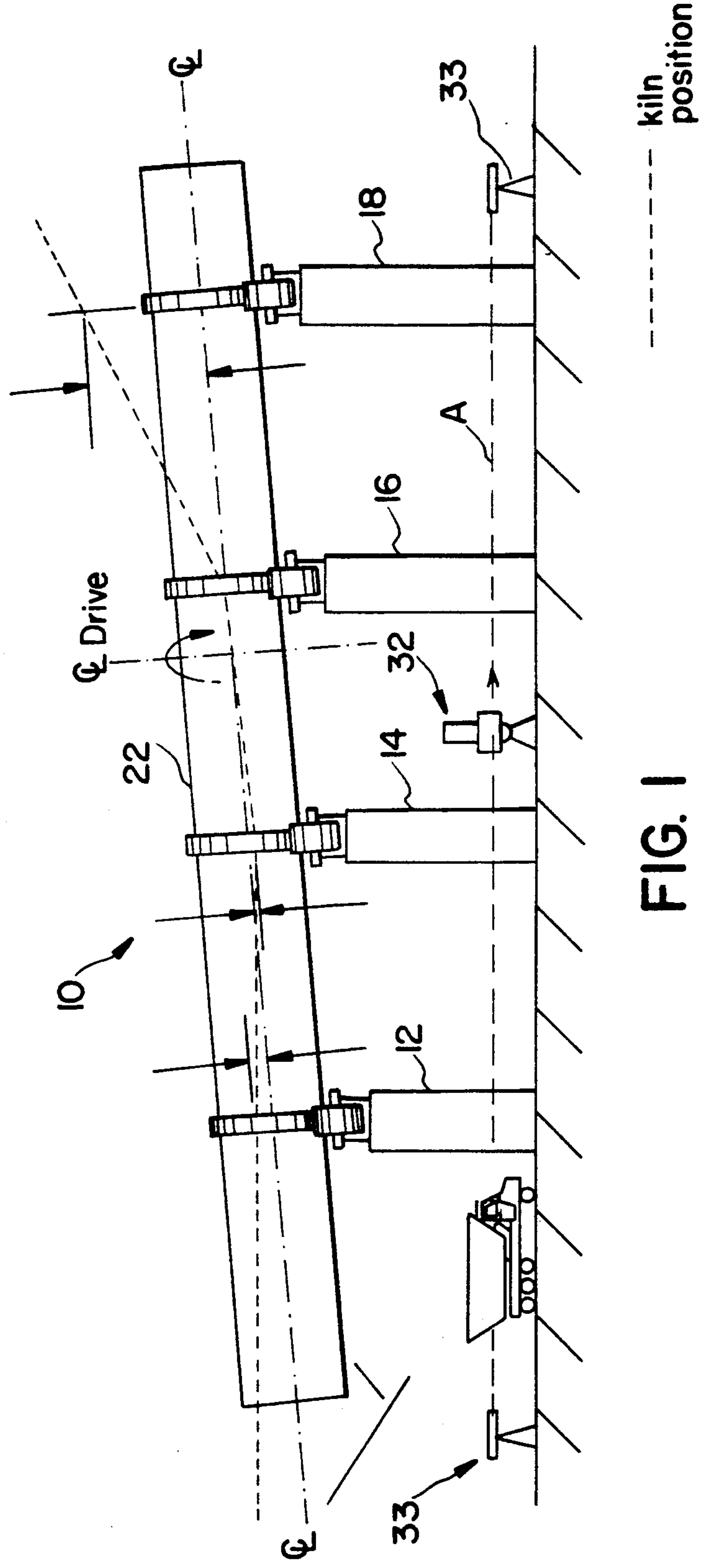
FIG. 1 is a schematic side elevation of a typical kiln arrangement.
Figure 2:
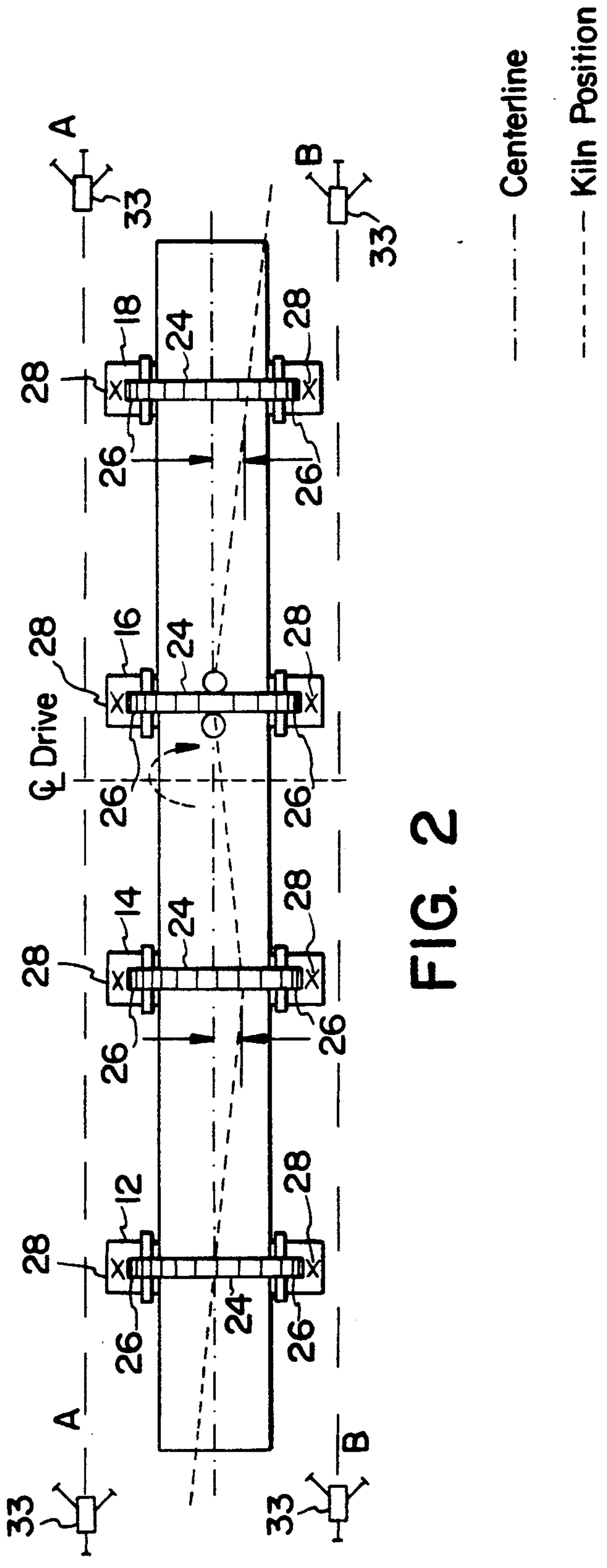
FIG. 2 is a plan view of the FIG. 1 kiln, indicating the arrangement of datum lines relative thereto.
Figure 3:
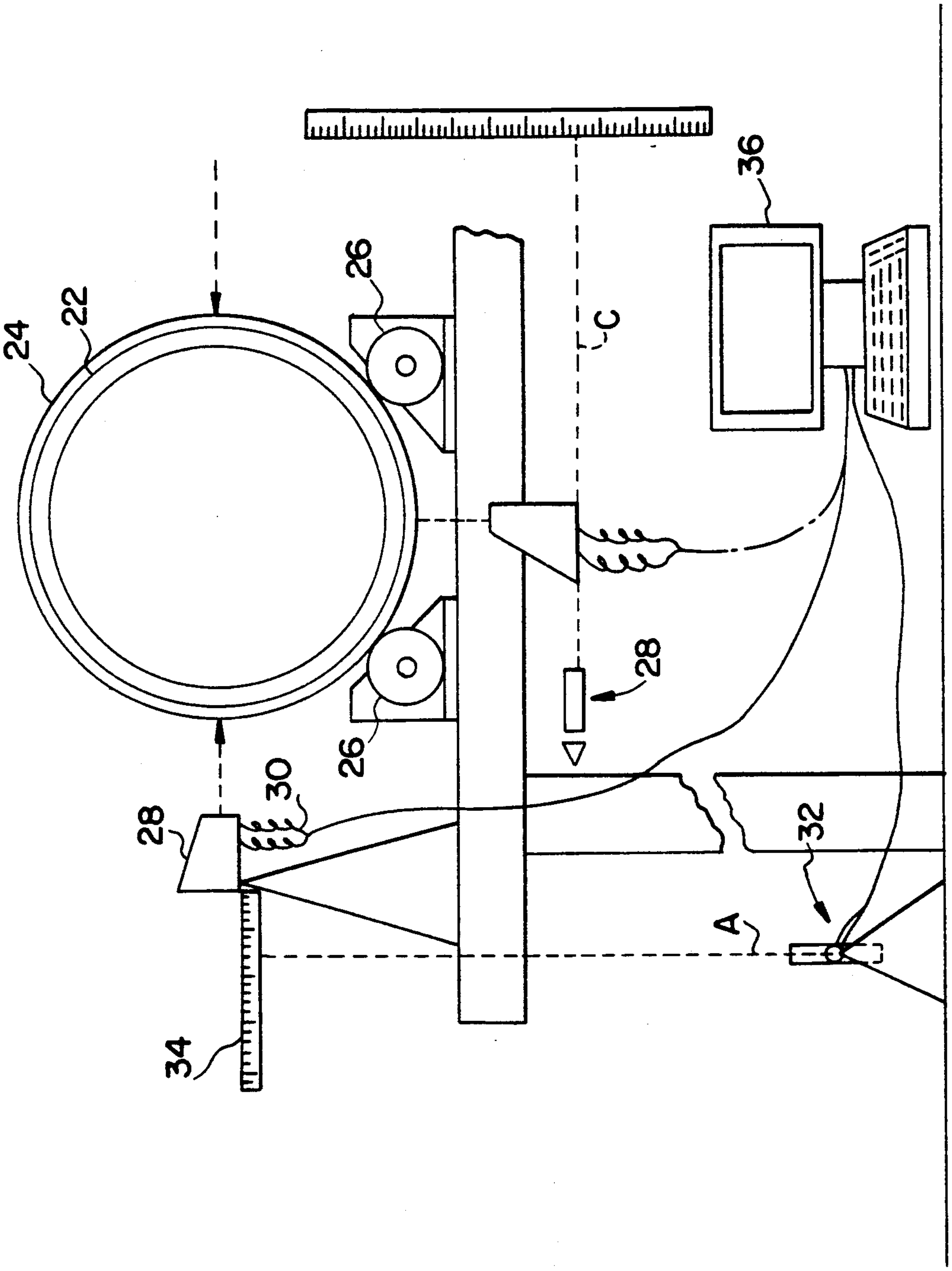
FIG. 3 is an end elevation showing a schematic set up relating the distance measuring radiant beam instrument to the respective vertical and horizontal datum planes.

Referring first to FIGS. 1, 2 and 3, a kiln 10, being generally of a high length to diameter ratio, is mounted upon piers 12, 14, 16, 18, 20.

The shell 22 is carried by tires 24, which are rotatably mounted on rollers 26.

The assembly is mounted atop the piers 12 to 20.

A radiant beam distance measuring device comprising a medium distance diode laser 28, mounted on tripod 30 is positioned at a suitable location, such as pier 18.

A theodolite instrument 32 is positioned upon the datum A—A or B—B, provided by a theodolite targets 33, the datum A—A and datum B—B being frequently made mutually parallel, and substantially parallel to the polar axis of kiln 10, for convenience.

The theodolite 32 is pivotal vertically in the plane containing reference datum A—A, enabling an optical alignment scale 34 of the instrument 28 to be read, so as to relate the instrument 28 directly to the datum A—A, provided by projector 33, as previously described, and referred to below.

The digital outputs from diode laser 28 and theodolite 32 may be connected with a computer 36, enabling high speed, simultaneous read outs by both instruments, in reading lateral distances to the kiln 10, and to the datum A—A or B—B.

Figure 4:
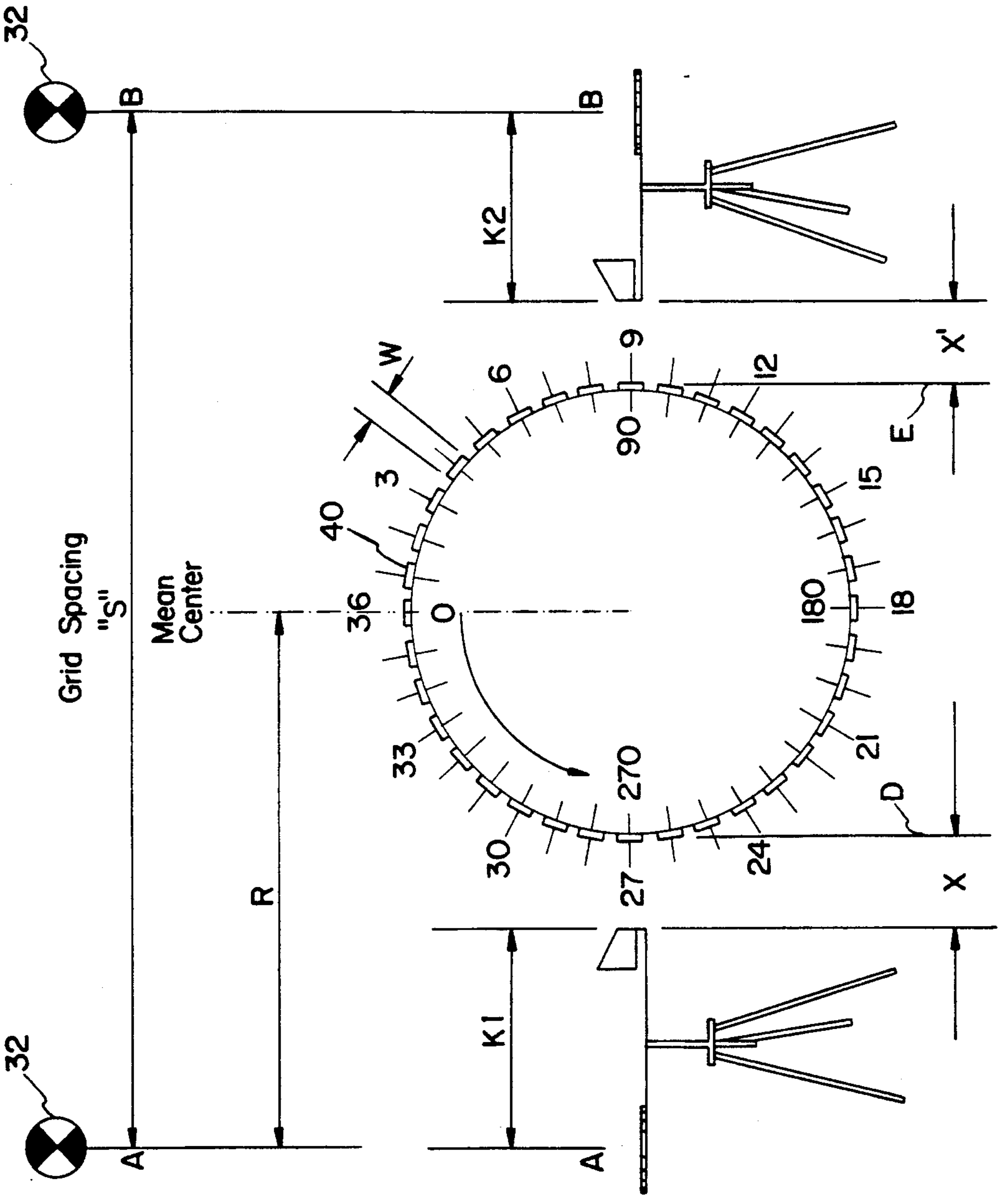
FIG. 4 is an enlarged schematic detail showing tire pads and the radiant beam instrument.
Figure 6:
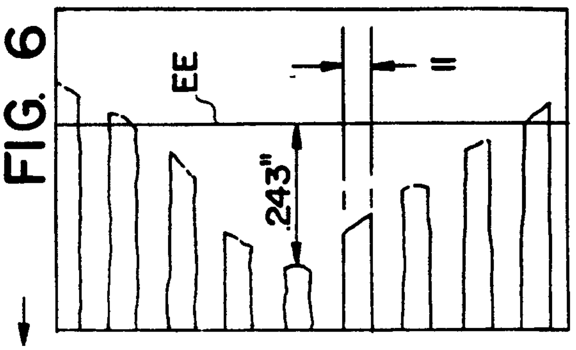
FIG. 6 is an enlarged portion of the FIG. 5 graph, showing an indication of shell deviation from the mean value.

FIG. 4 shows a typical arrangement of an annular ring of pads 40, mounted on the outer peripheral surface of the shell 22 of kiln 10. The tires 24 are generally mounted, somewhat loosely, upon the pads 40, which protrude axially from beneath the tires 24. The pads 40, illustrated as being thirty six in number, every third pad being numbered in the illustration, can serve as reading surfaces for the diode laser 28.

Figure 5:
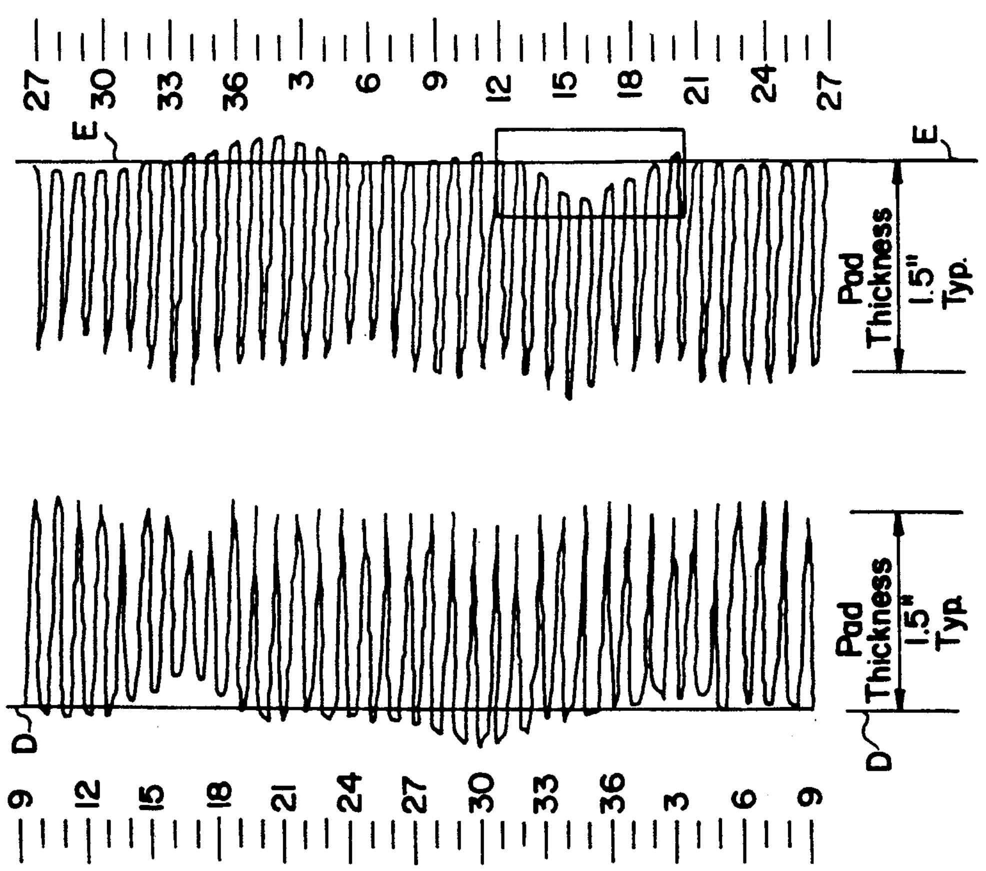
FIG. 5 is a typical shell profile graph showing peripheral variation and the mean shell position.

FIG. 5 shows a typical plot for one revolution of kiln 10.

Each of the pads 40 is clearly defined, owing to he high reading rate of the automated instrumentation.

The mean value of reading, shown by line DD and EE represent the mean or "true" position of the pad surfaces, from which is obtained the values of X and X1, from which the value R is obtained.

It will be understood that a simple computer program may be provided, to give a direct computational read out.

Alternatively, the control capability and storage capacity of computer 36 may be used to operate the system and provide graphic output as in FIG. 5, by which the mean value may be obtained, and the value of R calculated.

In operation, the datum plane base, or datum lines may be laid down, even in extremely arduous situations, to provide a reference grid to which the outputs from the diode laser 28 may be readily referenced, permitting ready determination of the true location of the mean centre of rotation of the mill.

This in turn makes readily possible the determination of the lateral correction to be applied to each of the support bearings or roller arrangements, for lateral correction to the kiln centre line.

It will be understood that the datum lines A—A and B—B, and their respective vertical reference planes do not require to be mutually parallel. It is beneficial that the datum lines be made parallel, for convenience, but this is not imperative.

The vertical distance readings are taken from a reference datum CC, using the diode laser 28 focussed on the bottom dead centre i.e. lower most pad surfaces. This yields a variation output akin to FIG. 5, whence the mean variation and the true position of the rotational axis may be obtained.

The desired vertical correction to the support rollers may be applied by appropriate change of the distance between the rollers supporting the respective bearing, to restore a substantially linear common axis of rotation to the kiln 10.

In the case of a kiln of constant diameter and uniform construction in regards both to plate thickness and the supporting rolls, the effects of kiln ovality may generally be neglected, as being substantially consistent, and therefore self-cancelling. However, in the case of kilns wherein the shell varies in diameter or construction, different rollers are used at respective support bearings, or where major thermal gradients exist, or other factors such as wear, create ovality or unevenly distributed ovality, it may be preferable to take the ovality of the kiln into account. This can be readily done by the use of an ovality beam, which measure the change in curvature of the shell for each revolution, at selected longitudinal locations. The variations in ovality are applied in a corrective sense to the vertical readings, to ensure linearity of the rotating polar axis, in the elevation view.

I claim:

1. Apparatus for determining the location of a body having a generally circular annular surface, during rotation thereof, comprising a diode laser distance measuring instrument for measuring distance from a predetermined location to an adjacent surface portion of the body positioned normally thereto, datum plane generating means comprising alignment target means in combination with theodolite instrument means for establishing a predetermined datum plane, location instrument means positionable precisely relative to said datum plane and moveable about a predetermined axis normal to said datum plane, indexed locating means extending normal to said plane in predetermined indexed relation with said diode laser and readable by said location instrument means, whereby the projected distance from the surface of said body to said datum plane comprises the algebraic sum of the readings of said diode laser and said location instrument means.

2. The apparatus as set forth in claim 1, in combination with electronic recording means electrically connected to outputs from the diode laser distance measuring instrument and the theodolite instrument means, to read simultaneous readings therefrom, enabling a multiplicity of said distance readings during rotation of said annular surface.

3. The apparatus as set forth in claim 2, wherein said automatic recording means comprises a computer.

* * * * *